Figure 1:
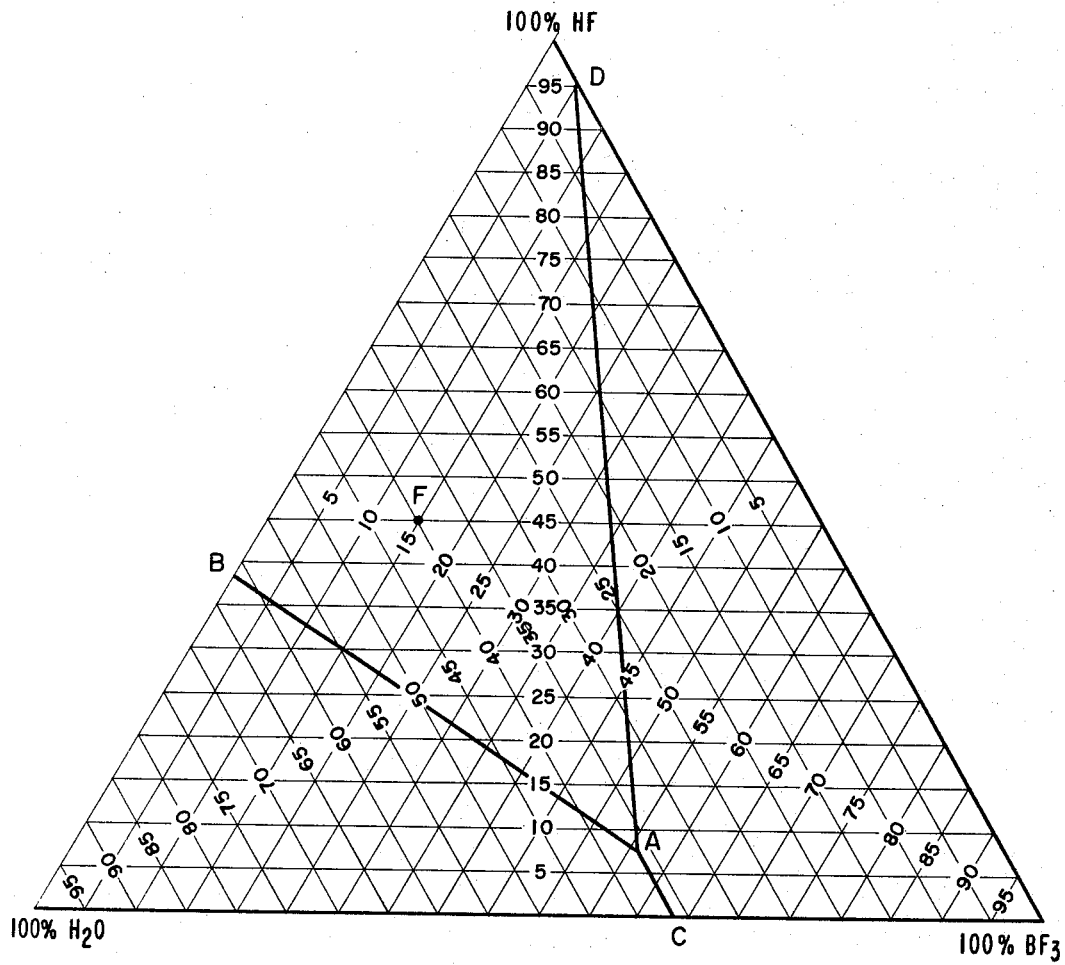

July 4, 1967  G. M. PETTINGILL  3,329,586
BORON TRIFLUORIDE DISTILLATION UNDER CONTROLLED PRESSURE
Filed March 29, 1963  3 Sheets-Sheet 1

INVENTOR
GENE M. PETTINGILL

BY

ATTORNEY

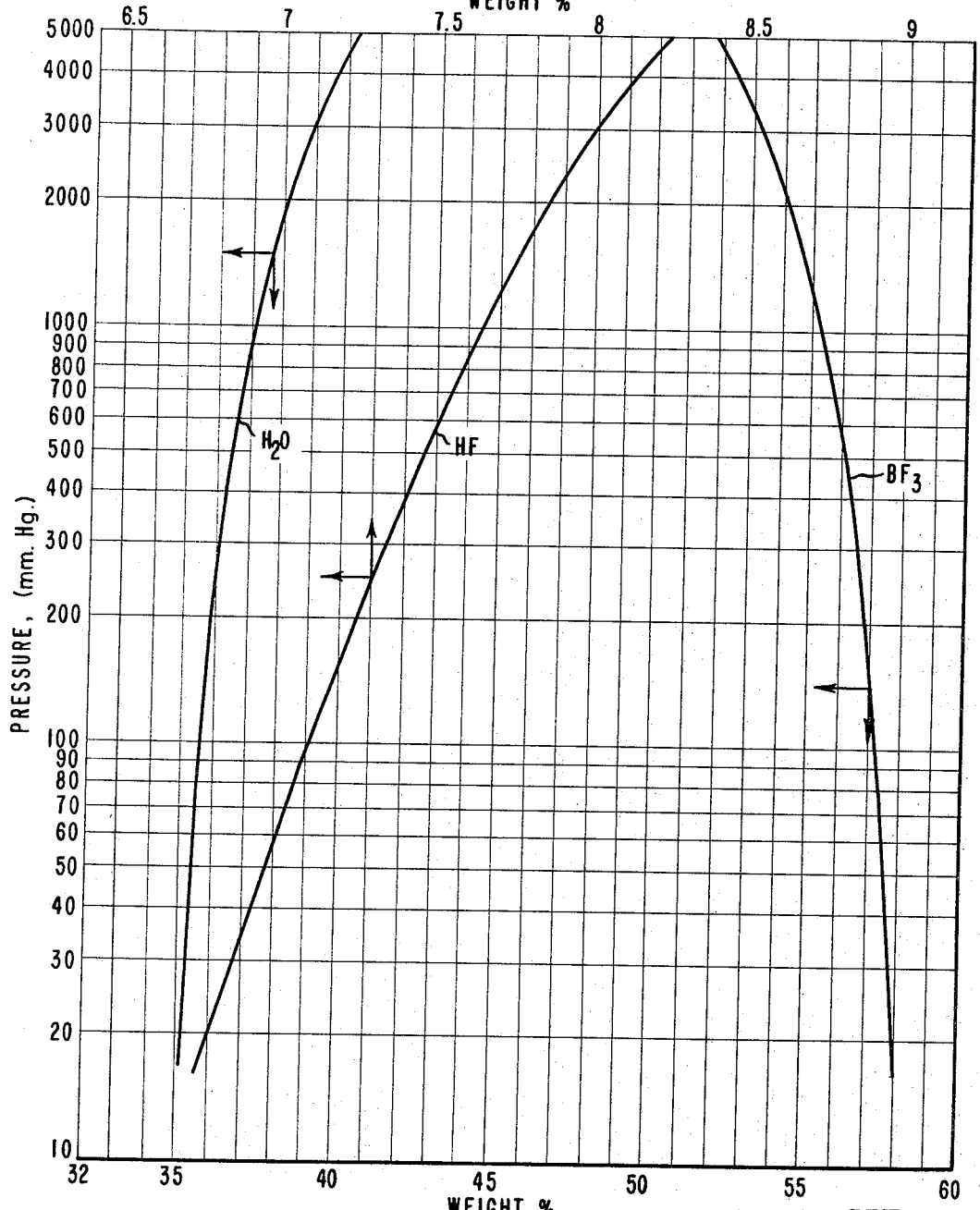

July 4, 1967 G. M. PETTINGILL 3,329,586
BORON TRIFLUORIDE DISTILLATION UNDER CONTROLLED PRESSURE
Filed March 29, 1963 3 Sheets-Sheet 3
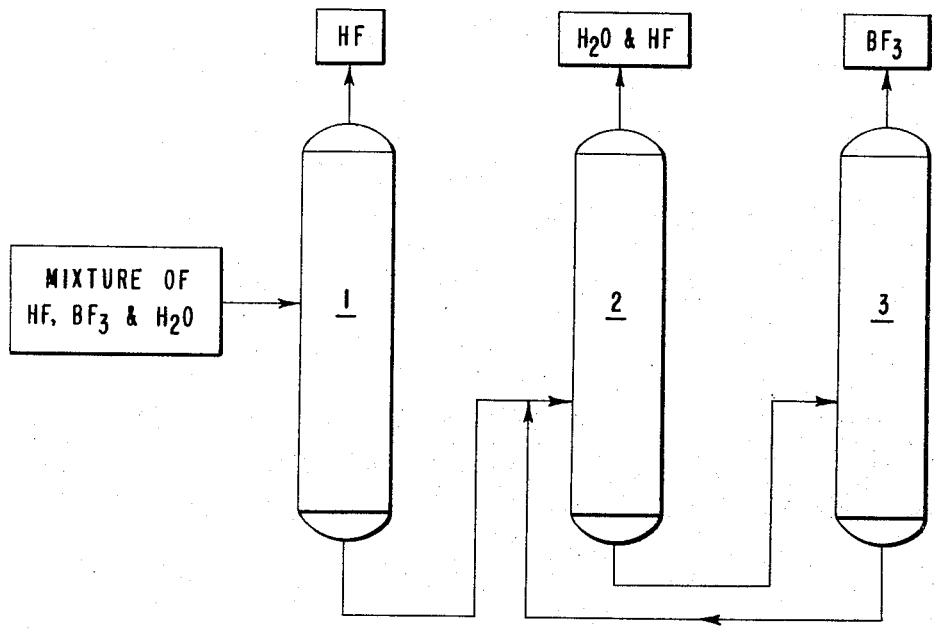
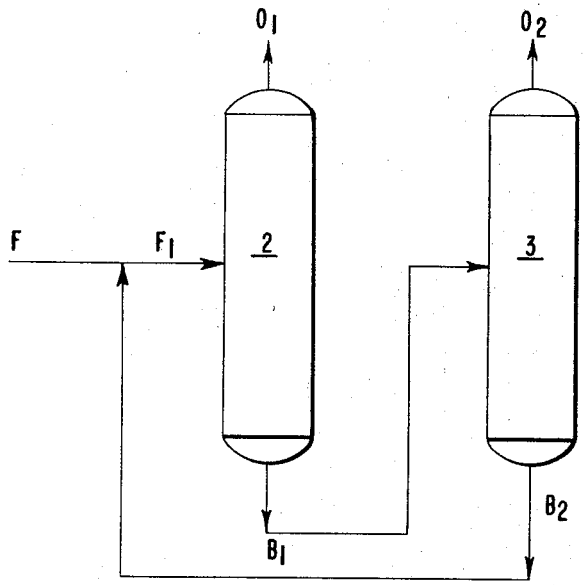
INVENTOR
GENE M. PETTINGILL
BY *John E. Schmidt*
ATTORNEY

United States Patent Office 3,329,586
Patented July 4, 1967

3,329,586
BORON TRIFLUORIDE DISTILLATION UNDER CONTROLLED PRESSURE
Gene M. Pettingill, Brookmeade, Wilmington, Del., assignor to E. I. du Pont de Nemours and Company, Wilmington, Del., a corporation of Delaware
Filed Mar. 29, 1963, Ser. No. 268,897
6 Claims. (Cl. 203—78)

This invention relates to a process for the recovery of boron trifluoride, and more particularly to its recovery from mixtures of boron trifluoride, hydrogen fluoride, and water.

Anhydrous boron trifluoride and hydrogen fluoride have found important uses as catalysts for the synthesis of organic materials. When used together, the catalysts generally combine with the organic material into the reaction mixture to form a more or less well characterized addition compound. In some instances the desired product of the synthesis is sufficiently stable that the anhydrous fluoride catalysts can be separated and recovered directly by distillation of the complex reaction mixture.

In other cases, however, the valuable organic portion of the complex is degraded by heating at temperatures necessary to liberate the hydrogen fluoride and boron trifluoride from the complex. In such instances, to minimize or prevent decomposition of the organic portion of the complex of organic compound, hydrogen fluoride and boron trifluoride may require the addition of other components which aid in liberating the organic fragment from the complex without causing degradation of the desired organic material.

More stable organic liquids have been used with some success in processing fluoride-containing complexes which include relatively unstable organic components, as is disclosed in U.S. Patent No. 2,534,017 and British Patent No. 713,335. This approach to the problem of decomposing the complex and recovering its components suffers from at least two drawbacks, viz., more or less resinification and loss of the desired organic reaction product due to heating in the presence of hydrogen fluoride and boron trifluoride, even at reduced temperatures and pressures for relatively short periods of time; and the necessity for recovering another component and thereby adding to the total cost of the process.

Other additives have been proposed for treatment of such complexes, e.g., the complex of p-tolualdehyde, boron trifluoride and hydrogen fluoride. Thus, the use of selected metal fluorides to decompose such a complex by combining with the boron trifluoride and the hydrogen fluoride, and liberating the aldehyde, in anhydrous or in aqueous systems has been disclosed in U.S. Patent No. 2,462,739, British Patents Nos. 812,064 and 825,225, and German Patent No. 938,964. These methods of treating the complex, however, are not free of disadvantages such as high investment and operating costs, associated with use and recovery of the metal fluorides, and sometimes poor recovery of the boron trifluoride, the hydrogen fluoride, or the organic material itself.

Water is one of the most effective and lowest cost additives which can be used for releasing the HF and $BF_3$ from such complexes. Its use is disclosed in U.S. Patent No. 2,485,237. According to this patent, treatment of the reaction mixture with water releases the organic material, an aromatic aldehyde, and leaves a mixture of water, hydrogen fluoride, and boron trifluoride. This aqueous mixture, however, can not be discarded as such on a large scale because it would constitute a serious source of pollution. Furthermore, to discard the relatively expensive HF and $BF_3$ would impose a severe economic penalty on a process which employs the fluorides as catalysts. Hence, the aqueous solution must be processed in such as way as to eliminate serious pollution hazards and at the same time to permit recovery of hydrogen fluoride and boron trifluoride suitable for reuse or for sale.

In copending patent application Ser. No. 259,125 filed Feb. 18, 1962, by E. R. Gray, C. N. Masten, and G. M. Pettingill, and assigned to the present assignee, an improved process is disclosed for using water to decompose a complex of p-tolualdehyde, boron trifluoride and hydrogen fluoride, said boron trifluoride and hydrogen fluoride being obtained in an aqueous solution which is of much higher fluoride concentration than previously achieved with water as the complex-breaking agent, and therefore can be processed for recovery of the fluorides much more economically than can the dilute aqueous wash solutions obtained by previously known treating processes.

Solutions of boron trifluoride and hydrogen fluoride in water also are encountered in hydrocarbon alkylation and rearrangement processes such as are disclosed in U.S. Patents Nos. 2,296,370, 2,363,116, and 2,589,621.

Thus, as described above, mixtures of water, boron trifluoride, and hydrogen fluoride frequently are encountered in industrial chemical processing operations, and eventually such mixtures must be treated to recover the fluorides, both to prevent serious pollution problems and to avoid the economic penalties which result from discarding the fluorides or attempting their recovery by techniques presently available.

As is known, distillation of mixtures of water, hydrogen fluoride, and boron trifluoride usually will release part of the individual components, depending on the original composition of the mixture being distilled. Complete separation of the components of such mixtures by fractional distillation, however, has not been achieved heretofore because of the formation and continued accumulation of ternary mixtures exceedingly difficult to separate, including the azeotrope having a boiling point of about 169° C. at atmospheric pressure (760 mm. mercury) and a composition substantially as follows:

|  | Molar Ratio | Percent by Weight |
|---|---|---|
| $BF_3$ | 1.0 | 55.7 |
| $H_2O$ | 2.48 | 36.7 |
| HF | 0.45 | 7.6 |

A mixture of this composition has the characteristics of a true azeotrope, i.e., it has a constant boiling point and the composition of a vapors is the same as that of the boiling liquid. The term "azeotrope-like mixture" is used herein to refer to the true azeotrope just mentioned as well as the other aforementioned ternary hydrogen fluoride-boron trifluoride-water mixtures having similar properties obtained at other than atmospheric pressure, all of which are described more fully hereinafter with reference to FIGURE 2.

This invention provides a process for separation of boron trifluoride from azeotrope-like mixtures of water, hydrogen fluoride and boron trifluoride. Since hydrogen fluoride and water can be separated from binary mixtures thereof by known procedures, this invention provides a method for the separation of all of the components of mixtures of hydrogen fluoride, boron trifluoride and water.

The process of this invention for the recovery of boron trifluoride from mixtures of hydrogen fluoride, boron trifluoride and water comprises first distilling the mixture until about an azeotrope-like mixture of hydrogen fluoride, boron trifluoride and water is obtained, then distilling such azeotrope-like mixture at a pressure at least about 100 mm. of mercury higher than that at which such azeotrope-like mixture was obtained to yield boron trifluoride. The distillation pressures employed in both distillation steps in the process of this invention are normally within the range of 20 to 4000 mm. of mercury. The process of this invention is normally used in separating mixtures containing less than about 58% by weight of boron trifluoride and is particularly adapted for use with hydrogen fluoride-boron trifluoride-water mixtures wherein hydrogen fluoride is the most volatile component, especially those falling within the area bounded by BAD in FIGURE 1, for example, those containing 15 to 30% by weight of boron trifluoride, 15 to 30% by weight of water and 40 to 70% by weight of hydrogen fluoride. With hydrogen fluoride-rich mixtures this overhead product obtained from the first of the aforementioned distillations consists essentially of hydrogen fluoride and water.

In order more fully to describe the present invention, reference is now made to the accompanying drawings in which FIGURE 1 is an equilibrium diagram of the composition $H_2O$, $BF_3$ and HF at atmospheric pressure; FIGURE 2 is a graph which correlates total vapor pressure with the composition of the aforementioned azeotrope-like mixtures of $H_2O$, $BF_3$ and HF including the true azeotrope obtained at atmospheric pressure; and FIGURES 3 and 4 are schematic diagrams of $BF_3$ recovery systems.

Referring now in greater detail to the drawings, FIGURE 1 is a triangular composition diagram which shows as point A the composition of the atmospheric pressure ternary azeotrope of $H_2O$, $BF_3$ and HF. B represents the known $H_2O$-HF azeotrope containing about 38% by weight of HF; C is the maximum boiling composition in the binary $H_2O$-$BF_3$ system and D represents the approximate composition of an HF-$BF_3$ binary azeotrope. In FIGURE 1, BAD represents the boundary of liquid compositions in which HF is the most volatile component and CAD represents the boundary of liquid compositions in which $BF_3$ is the most volatile component, while BAC represents the boundary of liquid compositions in which water is the most volatile component.

Azeotropic composition A also is included in FIGURE 2, which in addition shows a wide range of compositions of liquid ternary azeotrope-like mixtures of water, boron trifluoride and HF which boil at substantially constant temperatures at pressures from 20 mm. to 4000 mm. of mercury (approximately 62.7 lbs. per sq. in. gage). The data shown in FIGURE 2 were obtained by analyzing the liquid contained in the boiling vessel of a fractionating apparatus fitted with an efficient column and reflux condenser and operated adiabatically under substantially steady state conditions on mixtures of water, boron trifluoride, and hydrogen fluoride. While the curves of FIGURE 2 are not presented as representing true azeotropic compositions over the full range of distillation pressures, the curves and the compositions they represent are reproducible, the compositions are azeotrope-like in boiling properties and their formation prevents or seriously interferes with complete separation of the components of the ternary mixtures by conventional fractional distillation procedures.

The ternary compositions shown in FIGURE 2 contain from about 52 to about 58% by weight of boron trifluoride, the remainder being about 35 to 40% of water and about 6.8 to 8.2% of hydrogen fluoride based on the total weight of the composition.

The curves of FIGURE 2 show not only the compositions of the atmospheric pressure ternary azeotrope and the azeotrope-like ternary mixture which boil over a wide range of pressures, but they also show that the relative vapor pressures of the three components do not change uniformly and in the same direction with changes in pressure, and hence that the composition of the liquid remaining in the fractional distillation apparatus is dependent upon the pressure at which distillation is carried out. Inspection of the curves of FIGURE 2 indicates that, whereas the relative concentration of $H_2O$ plus HF increases in the still pot at higher distillation pressures, the relative concentration of $BF_3$ falls, thus indicating that $BF_3$ is preferentially liberated by distillations of given three component systems at higher operating pressures than those at which the azeotrope and azeotrope-like compositions were obtained, and that HF and $H_2O$ are preferentially liberated at relatively lower distillation pressures. If the feed composition is the atmospheric pressure ternary azeotrope, distillation at subatmospheric pressure will tend to liberate HF and $H_2O$, thereby enriching the residue in $BF_3$ content. However, if the same azeotropic feed composition is distilled at superatmospheric pressure, the overhead vapors will be rich in $BF_3$ and the residual liquid will be enriched in percentage content of HF and water.

It is apparent from the above disclosures that relatively greater changes in composition of both vapor and pot contents will be achieved by carrying out the distillation alternately between more widely separated pressure levels. However, the preferred operation of this process for making such separations will be at pressure levels which are conveniently and practicably achievable.

As previously mentioned, usually the fractional distillations are carried out at pressures of about from 20 to 4000 mm. of mercury absolute, the first distillation which yields the azeotrope-like mixture bottoms being preferably carried out at atmospheric pressure or below and the second $BF_3$ distillation being carried out at atmospheric or superatmospheric pressure. Having regard for the problems of maintaining reduced pressures in the operation of large distillation assemblies, for optimum operating efficiencies and for maximum $BF_3$ recovery per cycle, pressures of about from 30 to 200 mm. of mercury for the first distillation are preferred. For example, 75 mm. of mercury represents a particularly preferred pressure level for fractional distillation, with a maximum pot temperature of 115° C. Similar considerations as well as consideration of the corrosive nature of the ternary mixtures of $H_2O$, HF and $BF_3$, especially at elevated temperatures, with reference to the available and usable materials of construction, make pressures of about from 2500 to 3500 mm. preferred for the $BF_3$ distillation. For example, an operating pressure of 45 p.s.i.g. (about 3080 mm. of mercury) and a maximum pot temperature of 215° C. are particularly preferred conditions for distillation at the elevated pressure. However, other combinations of alternate distillation pressures can be used as exemplified herein, and the differences in pressure levels may be as small as 100 mm. of mercury while still maintaining adequate control over the distillations.

The separation of substantially anhydrous $BF_3$ from ternary mixtures, including the atmospheric pressure ternary azeotrope, is illustrated in the following examples.

EXAMPLE 1

This example illustrates a cyclic two-stage continuous distillation by which the concentration of $BF_3$ in a mixture of HF, $BF_3$ and water is first increased by distillation of the mixture at reduced pressure to remove $H_2O$ and HF, and then is decreased by distillation at superatmospheric pressure to give substantially anhydrous $BF_3$ overhead.

(A) *Operation at reduced pressure*

An all-copper distillation apparatus is used consisting of an electrically heated still pot attached to a copper column packed with 3/16" O.D. copper Raschig rings so that the column has a fractionating efficiency of 14 theoretical plates. Feed nozzles are provided at several locations, the preferred location being at a position equivalent to feeding midway between the 4th and 5th theoretical plates above the still pot. The still pot, fractionating column, and vapor line are insulated and electrically heated in a controlled manner so that the fractionations are carried out under substantially adiabiatic conditions. A condenser provides a controlled reflux and take-off of the overhead vapors. The conditions of operation are adjusted so that the system pressure measured at the column is 75 mm. of mercury, solution feed is at a location corresponding to the fourth theoretical plate, the still pot temperature does not exceed 115° C., the overhead vapor temperature is 54° C. and the reflux ratio is 1.06/1. The results achieved are summarized in the following tabulation.

|  | Percent HF | Percent $BF_3$ | Percent $H_2O$ |
|---|---|---|---|
| Feed solution | 8.2 | 53.9 | 37.9 |
| Overhead vapors | 24.6 | Nil | 75.4 |
| Bottoms | 7.1 | 57.5 | 35.4 |

The tabulated data show that distillation under the specified conditions removes as overhead an $HF-H_2O$ mixture entirely free of $BF_3$. All $BF_3$ is conserved in the still pot where its concentration increases from 53.9% to approximately 58%.

Conditions used to achieve these results must be observed carefully. Thus, sufficient fractionating capacity is provided to retain the $BF_3$. If the solution feed point is at the seventh plate above the still pot rather than at the fourth plate, thereby reducing the fractionating capacity above the feed point, $BF_3$ appears in the distillate. Likewise, reducing the reflux ratio to 0.5/1 leads to the appearance of about 1% of $BF_3$ in the overhead. With a fed of significantly different composition from that shown above, operating conditions necessarily must be adjusted so as to obtain an overhead free of $BF_3$.

(B) *Operation at elevated pressure*

The equipment is similar in construction to that described in A above, except that the column has a fractionating efficiency equivalent to 10 theoretical plates. Feed for this distillation comprises the azeotrope-like still bottoms from a step A lower pressure distillation. In this distallation at a higher pressure, step B, there is no reflux since the $BF_3$ overhead vapor stream is a noncondensible gas. The column, however, provides an effective stripping action so long as the feed enters the column at a position anywhere between the levels equivalent to the fifth and tenth plates. The other conditions of operation for the fractional distillation are a column pressure of about 3050 mm. of mercury (about 45 p.s.i.g.) and a maximum distillation pot temperature of 215° C. The results achieved are summarized in the following tabulation of the composition of the streams entering and leaving the fractional distillation equipment in step B:

|  | Percent HF | Percent $BF_3$ | Percent $H_2O$ |
|---|---|---|---|
| Feed solution | 7.0 | 57.6 | 35.4 |
| Overhead | Nil | 100.0 | Nil |
| Bottoms | 7.8 | 52.8 | 39.4 |

As shown by the data above, this portion of the distillation cycle gives a distillate of $BF_3$ free of HF and water.

The two steps, A and B, of the cyclic fractional distillation process when taken together provide a means of separating a ternary mixture into two fractions, viz., a $H_2O$-HF mixture free of $BF_3$ (lower pressure distillation) as one fraction, and $BF_3$ free of HF and $H_2O$ (higher pressure distillation) as the other fraction. Repetition of the cycle, by returning the bottoms from the higher pressure column to the lower pressure column, etc. provides additional recovery of anhydrous $BF_3$. The two-step cyclic distillation process, preferably operating between subatmospheric and superatmospheric pressure limits, thus provides a means of "breaking" the ternary azeotrope and azeotrope-like mixtures, and permits recovery therefrom of substantially anhydrous $BF_3$. Processes already are known for separating anhydrous HF from its solutions in water. Thus, a combination of the process of the instant invention with processes already known to those familiar with distillation arts permits a complete separation of the ternary azeotrope of $HF-BF_3-H_2O$ into its individual components.

It will be apparent that if substantially anhydrous boron trifluoride is not required, the conditions for the fractional distillation may be adjusted so that the overhead vapors will be composed predominantly of boron trifluoride accompanied by lesser quantities of water and hydrogen fluoride.

Small purges of distillation residues may be taken at suitable steps in the process to prevent the accumulation of objectionable quantities of minor contaminants, especially organic materials. As indicated above and in the following examples, conventional fractional distillation apparatus can be used in the process of this invention.

EXAMPLE 2

This example illustrates the present invention in quantitative terms when used for the recovery of $BF_3$ from the $HF-BF_3-H_2O$ mixture obtained in the manufacture of p-tolualdehyde as described in copending application Ser. No. 259,125 by Gray et al. referred to above. In this example the process of the present invention is integrated with an HF stripping operation as shown in FIGURE 3, and described below.

The aqueous solution of $HF-BF_3$ catalyst after enrichment with HF and $BF_3$ in a gas scrubber is an aqueous solution containing minor amounts of organic material and about 55% HF, 24% $BF_3$, and 21% $H_2O$. This solution is relatively water-poor by comparison with the composition of the ternary azeotrope. The solution is passed to an HF-stripping still 1 operated at about 25 p.s.i.g. pressure which permits removal overhead of substantially pure HF which is condensed and stored for reuse. The stripped solution from still 1 constitutes the feed solution for the lower pressure still 2. Still 2 operating under substantially the conditions described in Example 1A produces 30% HF solution overhead which is collected for subsequent processing to convert it to more concentrated HF solution or to recover anhydrous HF and water by known distillation processes. The azeotrope-like bottoms from still 2 pass to the higher pressure still 3 operating at about 45 p.s.i.g. substantially as described in Example 1, step B. This distillation produces an overhead of substantially anhydrous $BF_3$ which is compressed and stored. Bottoms from the higher pressure still 3 are azeotrope-like in composition at the operating pressure and are returned to the reduced pressure still 2 and may constitute part or all of the feed for this still. Actually, in a commercial operation, the fractionations are operated on a continuous basis, the bottoms from still 3 being combined with bottoms from still 1 to provide the feed for still 2. Data in the table below demonstrate the process of the instant invention for recovery of anhydrous boron trifluoride when carried out in combination with other processing steps which are used in the recovery of HF and $BF_3$ from an aqueous solution such as that produced in the process disclosed in the above-cited copending patent application.

For the HF-stripping still 1 (FIG. 3):

| Feed Composition | | | Product Streams | | |
|---|---|---|---|---|---|
| Ingredient | Percent by wt. | Lbs. | Ingredient | Percent | Lbs. |
| HF | 55 | 660 | Overhead: HF | 100 | 585 |
| $BF_3$ | 24 | 288 | Bottoms: | | |
| $H_2O$ | 21 | 252 | HF | 12.4 | 76 |
| Total | 100 | 1,200 | $BF_3$ | 47.0 | 289 |
|  |  |  | $H_2O$ | 40.6 | 250 |
|  |  |  | Total | 100.0 | 1,200 |

In this and the succeeding tabulations of data in this example, the mechanical and manipulative losses are disregarded. The bottoms from still 1 constitute the feed for still 2 operating at 75 mm. Hg pressure and are processed by the cyclic distillation of the instant invention. Operation of the lower pressure fractionation column 2 is summarized below.

For the lower pressure still 2 (FIG. 3):

| Feed Composition | | | Product Streams | | |
|---|---|---|---|---|---|
| Ingredient | Percent | Lbs. | Ingredient | Percent | Lbs. |
| HF | 12.4 | 76 | Overhead: | | |
| $BF_3$ | 47.0 | 289 | HF | 29.8 | 35.3 |
| $H_2O$ | 40.6 | 250 | $H_2O$ | 70.2 | 83.0 |
| | | | Bottoms: | | |
| Total | 100.0 | 615 | HF | 8.0 | 39.7 |
| | | | $BF_3$ | 58.0 | 288.0 |
| | | | $H_2O$ | 34.0 | 169.0 |
| | | | Total | | 615.0 |

The overhead of approximately 30% HF solution from still 2 is stored, and the bottoms from still 2 are the feed for the higher pressure still 3 which operates at approximately 45 pounds per square inch gauge, with results as shown below.

For the higher pressure still 3 (FIG. 3):

| Feed Composition | | | Product Streams | | |
|---|---|---|---|---|---|
| Ingredient | Percent | Lbs. | Ingredient | Percent | Lbs. |
| HF | 8 | 39.7 | Overhead: $BF_3$ | 100.0 | 35.0 |
| $BF_3$ | 58 | 288.0 | Bottoms: | | |
| $H_2O$ | 34 | 169.0 | HF | 8.6 | 39.7 |
| | | | $BF_3$ | 54.8 | 253.0 |
| Total | 100 | 496.7 | $H_2O$ | 36.6 | 169.0 |
| | | | Total | | 496.7 |

Thus, by the operation of one cycle of the process of the present invention (still 2 and still 3) 35.0 lbs. of anhydrous $BF_3$ is recovered. The bottoms from still 3 then are returned to still 2. Preferably, the bottoms from still 3 are combined with bottoms from still 1 for further processing in an integrated continuous fractionation operation.

EXAMPLE 3

This example illustrates the process of the instant invention wherein the cyclic distillation for recovery of boron trifluoride is operated at different pressure levels, one subatmospheric and the other atmospheric. More specifically, this example shows results attained when the distillations are carried out alternately at 20 mm. pressure and 760 mm. (atmospheric) pressure.

Referring to FIGURE 4, the feed F to the lower pressure still 2 is substantially the ternary azeotrope obtained at atmospheric pressure and contains about 55.6% of boron trifluoride, 7.4% of hydrogen fluoride, and 37% water. The operation of still 2, a conventional continuous distillation column, is carried out at 20 mm. pressure with a bottom operating temperature of about 88° C., and with an adequate number of contacting stages and reflux ratio to give an overhead product $O_1$ consisting of 16.5% aqueous HF. As shown by inspection of FIGURE 2, distillation at 20 mm. pressure gives a column bottoms composition $B_1$ enriched in $BF_3$, with reference to the feed composition. The bottoms then are fed to still 3, a conventional continuous distillation column operated at 760 mm. pressure and a bottoms temperature of about 170° C., from which the overhead stream $O_2$ is substantially pure boron trifluoride and the bottoms $B_2$ has substantially the composition of the ternary azeotrope at atmospheric pressure.

The operation of the distillation system described in this example, based on 100 pounds of ternary mixture processed, is summarized in the following table:

| Stream | Percent by Weight | | | Weight in lbs. | | |
|---|---|---|---|---|---|---|
| | HF | $BF_3$ | $H_2O$ | HF | $BF_3$ | $H_2O$ |
| F | 7.4 | 55.6 | 37.0 | 7.4 | 55.6 | 37.0 |
| $F_1$ | 7.4 | 55.6 | 37.0 | 76.0 | 572.0 | 379.5 |
| $O_1$ | 16.5 | | 83.5 | 7.4 | | 37.0 |
| $B_1$ | 7.0 | 58.0 | 35.0 | 68.6 | 572.0 | 342.5 |
| $O_2$ | | 100.0 | | | 55.6 | |
| $B_2$ | 7.4 | 55.6 | 37.0 | 68.6 | 516.4 | 342.5 |

As shown above, the net result of the above procedure is the recovery of 55.6 lbs. of substantially anhydrous $BF_3$ (stream $O_2$) and the collection of 44.4 lbs. (stream $O_1$) of 16.5% aqueous hydrofluoric acid for storage and further processing.

EXAMPLE 4

This example illustrates the process of the present invention wherein the cyclic distillation for recovery of boron trifluoride is carried out alternately at 760 mm. Hg in the lower pressure still 2, and at 3862 mm. Hg (60 p.s.i.g.) in the higher pressure still 3. The flow of materials in the cyclic distillation system under equilibrium conditions for a period of time during whch 100 pounds of ternary azeotrope is fed and processed is illustrated in FIGURE 4, and summarized in the table below:

| Stream | Percent by Weight | | | Weight in lbs. | | |
|---|---|---|---|---|---|---|
| | HF | $BF_3$ | $H_2O$ | HF | $BF_3$ | $H_2O$ |
| F | 8.1 | 52.5 | 39.4 | 8.1 | 52.5 | 39.4 |
| $F_1$ | 8.1 | 52.4 | 39.5 | 68.1 | 444.0 | 334.4 |
| $O_1$ | 17.1 | | 82.9 | 8.1 | | 39.4 |
| $B_1$ | 7.4 | 55.6 | 37.0 | 60.0 | 444.0 | 295.0 |
| $O_2$ | | 100.0 | | | 52.5 | |
| $B_2$ | 8.1 | 52.5 | 39.4 | 60.0 | 391.5 | 295.0 |

The net result is the recovery of 52.5 lbs. of substantially anhydrous $BF_3$ (stream $O_2$), and the collection of 47.5 lbs. (stream $O_1$) of 17.1% hydrofluoric acid for storage and separate processing.

In Examples 3 and 4 above, the ternary azeotrope at atmospheric pressure is one of the in-process streams. These examples, accordingly, provide an effective and convenient demonstration that the present invention overcomes the difficulty heretofore encountered, viz, the formation of a ternary azeotrope, in attempting to separate and recover the three components by distillation at atmospheric pressure. Although the ternary mixtures obtained as residues by careful fractional distillation of $HF-BF_3-H_2O$ mixtures at pressures other than 760 mm. of mercury have not been fully characterized as true azeotropes, such ternary mixtures have been shown to form reproducibly over a wide range of distillation pressures, and to be separable by application of the process described herein. The instant invention, therefore, represents a surprisingly effective and economical means of achieving the separation of said ternary mixtures into substantially anhydrous boron trifluoride and mixtures of hydrofluoric acid and water, which latter mixtures, in turn, can be processed independently for separation of their constituents by previously known distillation procedures, which in themselves are not a part of the present invention. Dilute aqueous HF obtained herein, for example, can be distilled at atmospheric pressure to yield $H_2O$ and 38% aqueous HF. The 38% aqueous HF can be used as described in the aforementioned Gray et al. application. Alternately, the dilute HF can be subjected to cyclic vacuum-pressure distillation, $H_2O$ and HF being obtained as the overhead products from the vacuum and pressure columns, respectively.

It will be appreciated that the process of the present invention can be integrated with other steps for processing mixtures of water, boron trifluoride, and hydrogen fluoride, especially with other distillation steps, as illustrated in Example 2. This condition is even more apparent upon examining FIGURE 1 in which A is the composition of the ternary azeotrope at atmospheric pressure. As previously mentioned, areas in FIGURE 1 are delineated wherein three component compositions will liberate one of the components preferentially upon careful fractional distillation. Three component mixtures under conditions of efficient fractionation at atmospheric pressure liberate the most volatile component first, followed by the indicated binary composition, until the composition remaining is that of the ternary azeotrope A. For example, from a composition represented by point F, hydrogen fluoride will be liberated, followed by the binary azeotrope B containing about 38% hydrogen fluoride and 62% water, leaving a distillation residue having the composition of the ternary azeotrope A, which will not change in composition on continued distillation. Then, in turn, by the practice of the invention disclosed herein, the ternary azeotrope is separated into $BF_3$ and aqueous HF. In fact, the ternary mixture represented by point F in FIGURE 1, can be considered to consist of a ternary azeotrope of composition A, the well known binary composition consisting of about 38% HF in water, and pure HF, these being listed in order of increasing volatility.

Although it is not known definitely that true ternary azeotropes of water, boron trifluoride, and hydrogen fluoride form at pressures appreciably above and below one atmosphere, the data represented by FIGURE 2 indicate that three-component azeotrope-like compositions are reproducibly generated by efficient fractional distillation over a wide range of pressures. The process of cyclical distillation at two substantially different pressures, as disclosed herein, achieves a cleavage of all such ternary mixtures, with recovery of substantially anhydrous $BF_3$, together with combinations of water and hydrogen fluoride which are processable by known distillation techniques to achieve a partial or essentially complete separation of water and hydrogen fluoride, as desired.

Disclosures included in this specification will make apparent many changes in details without departing from the invention or sacrificing any of its important advantages.

I claim:
1. A process for the recovery of boron trifluoride from a mixture of hydrogen fluoride, boron trifluoride and water wherein the hydrogen fluoride component comprises at least about seven percent of the said feed mixture which comprises distilling said mixture to yield a first liquid bottoms azeotrope in equilibrium, at the pressure of the first distillation, with a vapor of about the same composition, and then distilling said first liquid bottoms at a pressure at least about 100 mm. of mercury higher than the pressure at which the first-mentioned distillation was carried out to yield substantially pure boron trifluoride overhead, said distillations being carried out within the range of about 20 to 4000 mm. of mercury.

2. A process for the recovery of boron trifluoride from a mixture of hydrogen fluoride, boron trifluoride and water falling within the area corresponding to BAD in FIGURE 1 where hydrogen fluoride is the most volatile component, containing less than 58% by weight of boron trifluoride which comprises distilling said mixture to yield a first liquid liquid bottoms azeotrope substantially in equilibrium, at the pressure of the first-mentioned distillation, with a vapor of about the same composition, while withdrawing aqueous hydrogen fluoride as the overhead product, and then distilling said bottoms at a pressure at least about 100 mm. of mercury higher than that at which the first-mentioned distillation was carried out to yield substantially pure boron trifluoride overhead product, said distillations being carried out at pressures of about 20 to 4000 mm. of mercury.

3. A process of claim 2 wherein said first-mentioned distillation is carried out at a pressure about from 20 to 760 mm. of mercury, the feed to said second-mentioned distillation comprising the bottoms from said first-mentioned distillation, said bottoms being substantially in equilibrium, at the pressures of said first-mentioned distillation, with a vapor of about the same composition, said second-mentioned distillation being at a pressure about from 760 to 4000 mm. of mercury, the difference between said distillation pressures being at least 100 mm. of mercury.

4. A process of claim 3 wherein the molar ratios of boron trifluoride, water and hydrogen fluoride in said feed are about 1:2.5:0.5, respectively, said feed having a constant boiling point of about 169° C. at about atmospheric pressure.

5. A process of claim 3 wherein the bottoms of said second-mentioned distillation are recycled to said first-mentioned distillation.

6. A process for the recovery of boron trifluoride from a mixture of about from 40 to 70% by weight of hydrogen fluoride, about from 15 to 30% by weight of boron trifluoride and about from 15 to 30% by weight of water which comprises stripping hydrogen fluoride from said mixture, fractionally distilling the resulting stripped mixture at a pressure of about from 20 to 100 mm. of mercury to recover aqueous hydrogen fluoride overhead, leaving an azeotropic mixture of hydrogen fluoride, boron trifluoride and water as the bottoms, said mixture being in equilibrium, at the pressures of the first distillation, with a vapor of the same composition, fractionally distilling said last mentioned mixture at a pressure of about from 2500 to 3500 mm. of mercury to yield substantially pure boron trifluoride overhead product, and recycling the bottoms from said second-mentioned distillation to said first-mentioned distillation.

References Cited

UNITED STATES PATENTS

| | | | |
|---|---|---|---|
| 2,160,576 | 5/1939 | Loder | 203—80 |
| 2,409,773 | 10/1946 | Luten et al. | 203—77 |
| 2,419,504 | 4/1947 | Schulze et al. | 23—205 |
| 2,445,217 | 7/1948 | Frey | 203—78 X |
| 2,507,499 | 5/1950 | Cade | 23—205 X |
| 2,697,027 | 12/1954 | Swinehart et al. | 23—205 |
| 2,805,982 | 9/1957 | Swinehart et al. | 203—12 |
| 2,877,864 | 3/1959 | Cromwell et al. | 23—205 X |
| 2,997,371 | 8/1961 | Wadsworth et al. | 23—205 |

NORMAN YUDKOFF, *Primary Examiner.*

F. E. DRUMMOND, *Assistant Examiner.*